United States Patent
Lucidarme et al.

(10) Patent No.: US 6,462,449 B1
(45) Date of Patent: Oct. 8, 2002

(54) ROTATING ELECTRIC MACHINE WITH IMPROVED DOUBLE EXCITATION

(75) Inventors: Jean Lucidarme, Ste Genevieve des Bois; Mohamed Gabsi, Cachan; Michel Lecrivain, Seine; Hamid Ben Ahmed, Saint Maur, all of (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 09/857,619

(22) PCT Filed: Dec. 2, 1999

(86) PCT No.: PCT/FR99/02994

§ 371 (c)(1),
(2), (4) Date: Aug. 31, 2001

(87) PCT Pub. No.: WO00/35065

PCT Pub. Date: Jun. 15, 2000

(30) Foreign Application Priority Data

Dec. 7, 1998 (FR) ............................................. 98 15424

(51) Int. Cl.[7] ..................... H02K 19/24; H02K 15/02
(52) U.S. Cl. .................. 310/156; 310/162; 310/261
(58) Field of Search .................. 310/156.48, 156.55, 310/156.56, 156.49

(56) References Cited

U.S. PATENT DOCUMENTS 3,443,201 A      5/1969   Williams
4,296,544 A   *  10/1981  Burgmeier .................... 29/598
4,658,167 A   *   4/1987  Popov ......................... 310/156
4,700,097 A   *  10/1987  Kawada ....................... 310/162
4,709,179 A   *  11/1987  Banon ......................... 310/156
5,066,880 A   *  11/1991  Banon ......................... 310/156
6,013,962 A   *   1/2000  Nashiki ....................... 310/156
6,093,992 A   *   7/2000  Akemakou .................... 310/156

FOREIGN PATENT DOCUMENTS

| DE | 21 09 569 | | 9/1972 | |
| FR | 1 439 764 | | 8/1966 | |
| FR | 2762722 | * | 4/1997 | ............ H02K/1/06 |
| FR | 2 762 722 | | 10/1998 | |
| JP | 08-251888 | | 9/1996 | |
| JP | 08251888 | * | 9/1996 | .......... H02K/19/24 |

* cited by examiner

Primary Examiner—Nestor Ramirez
Assistant Examiner—Iraj A Mohandesi
(74) Attorney, Agent, or Firm—Young & Thompson

(57) ABSTRACT

A rotating electric machine whereof the rotor includes a magnetic core provided with radial teeth, uniformly distributed at its periphery, annular magnets arranged on either side of the core axial ends and magnetic end flanges pressing the annular magnets against the core, magnetic bars linking the end flanges together, housed in the spaces between the radial teeth, additional magnets being interposed between each of the bars and at least the side walls of the core radial teeth defining the spaces. The stator includes a magnetic core, excitation coils arranged on either side of the core, a stator coil wound on the core and a magnetic ring in contact with the core and provided with radial rims co-operating with the axial rims of the rotor end flanges to form paths for the return flux.

10 Claims, 3 Drawing Sheets

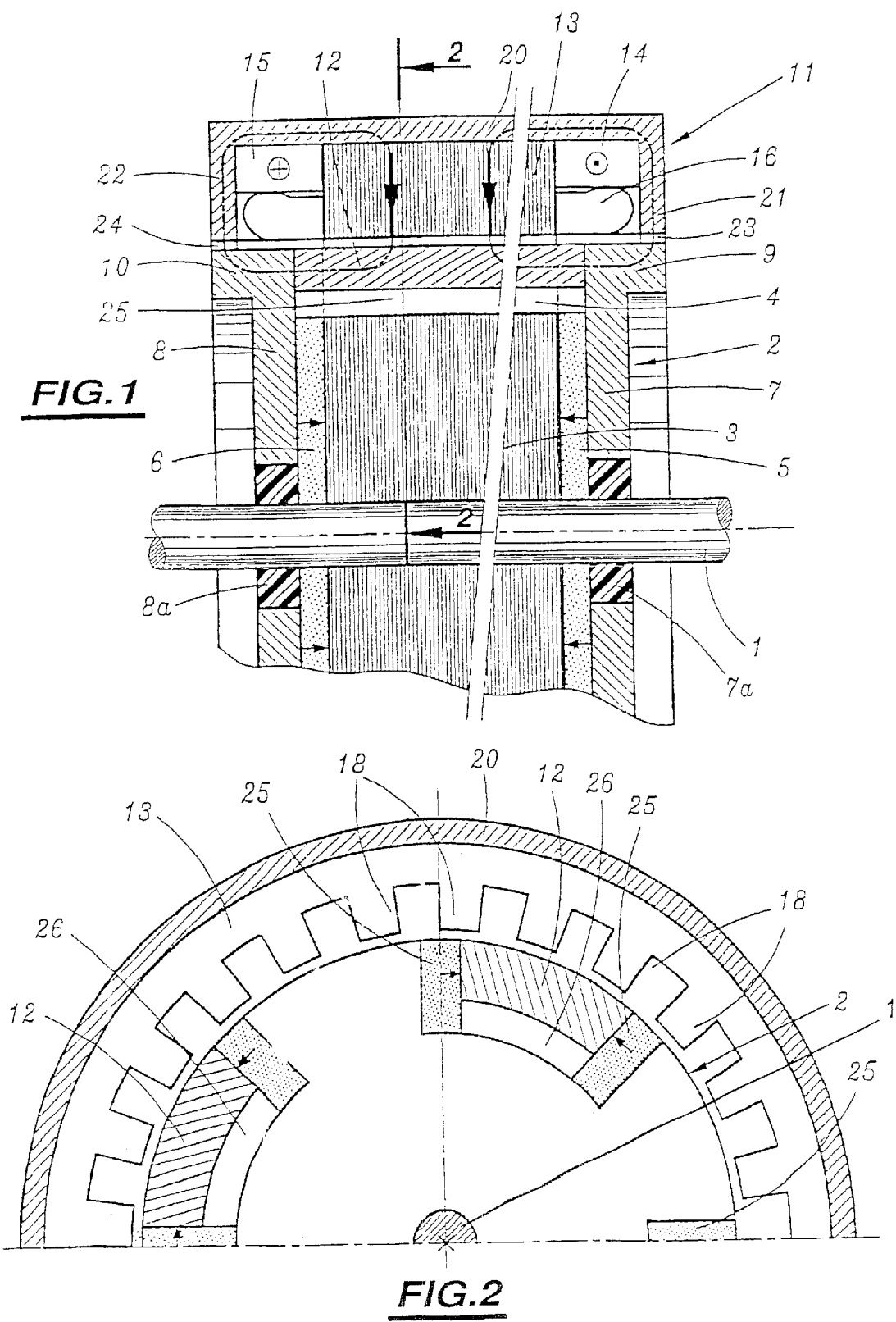

ROTATING ELECTRIC MACHINE WITH IMPROVED DOUBLE EXCITATION

BACKGROUND OF THE INVENTION

The present invention relates to rotating electric machines and more especially concerns synchronous machines, such as alternators for motor vehicles, traction motors or the like.

DESCRIPTION OF THE RELATED ART

Among the known machines, mention may be made of machines employing excitation by coils mounted in the rotor, machines employing excitation by magnets mounted in the rotor and machines employing double excitation by coils and magnets mounted in the rotor.

Such machines are described in particular in patent application FR-97 03 429 filed on Mar. 20, 1997 by the Centre National de la Recherche Scientifique [French National Centre for Scientific Research].

Such a machine comprising a rotor whose magnetic circuit carries excitation elements and a stator whose magnetic circuit carries a stator coil, is characterized in that the magnetic circuit of the rotor comprises, mounted on a shaft, end flanges and at least one toothed disc arranged between the end flanges, the teeth of the toothed disc being uniformly distributed at its periphery and at least one annular piece mounted on the end flanges and furnished with apertures uniformly distributed at its periphery and in each of which is engaged a tooth of at least one toothed disc, the end flanges and said at least one toothed disc defining between them, spaces in which excitation elements are housed.

Furthermore, patent application FR-97 05 030 filed on Apr. 23, 1997 by the Centre National de la Recherche Scientifique describes a rotating electric machine of the double excitation type mounted on a shaft comprising a rotor whose magnetic circuit carries at least one excitation element and a stator whose magnetic circuit carries a stator coil, characterized in that said at least one excitation element comprises at least one annular magnet associated with at least two discs each furnished with radial teeth uniformly distributed at their periphery and at least one annular piece furnished with apertures in each of which is engaged without contact, a tooth of at least one toothed disc, and in that the magnetic circuit of the stator comprises an even number at least equal to two annular magnetic circuit elements, at least one stator excitation coil being disposed between at least two neighboring elements from among said magnetic circuit elements.

Although giving acceptable results and allowing the elimination of brushes, the machines of the aforesaid type exhibit a low per-magnet rotor excitation active gap area.

SUMMARY OF THE INVENTION

The invention aims to create a double-excitation machine which while exhibiting the same advantages as the aforesaid machine, in particular as regards adjustment via double excitation and the elimination of brushes, comprises enhanced per-magnet rotor excitation.

Its subject is therefore a rotating electric machine with double excitation comprising a rotor and a stator whose magnetic circuit carries a stator coil, in which machine the stator comprises an annular magnetic core and at least one excitation coil, the stator coil being wound on the core, the assembly being arranged in at least one magnetic ring in contact with the outer surface of the stator core, said at least one ring comprising at least one radial end rim, and the rotor comprises a magnetic circuit exhibiting peripheral portions, said radial end rims of said at least one magnetic ring of the stator defining, with the peripheral portions of the magnetic circuit of the rotor, gaps forming flux return paths, characterized in that the rotor comprises magnetic end flanges whose peripheral portions define with the radial end rims of said at least one magnetic ring of the stator, said flux return gaps and arranged between the magnetic end flanges, a magnetic core provided with radial teeth uniformly distributed at its periphery, annular magnets arranged on either side of the axial ends of the core and applied against the core by the magnetic end flanges and several magnetic pieces for interlinking the end flanges, formed of bars for linking the end flanges housed in the spaces between the radial teeth of the magnetic core.

BRIEF DESCRIPTION OF THE DRAWINGS

The invention will be better understood with the aid of the description which follows, given merely by way of example and while referring to the appended drawings, in which:

FIG. 1 is a view in elevation and in section of a rotating machine according to the invention;

FIG. 2 is a view in section along the line 2—2 of FIG. 1;

DESCRIPTION OF THE PREFERRED EMBODIMENT

Figure 3:
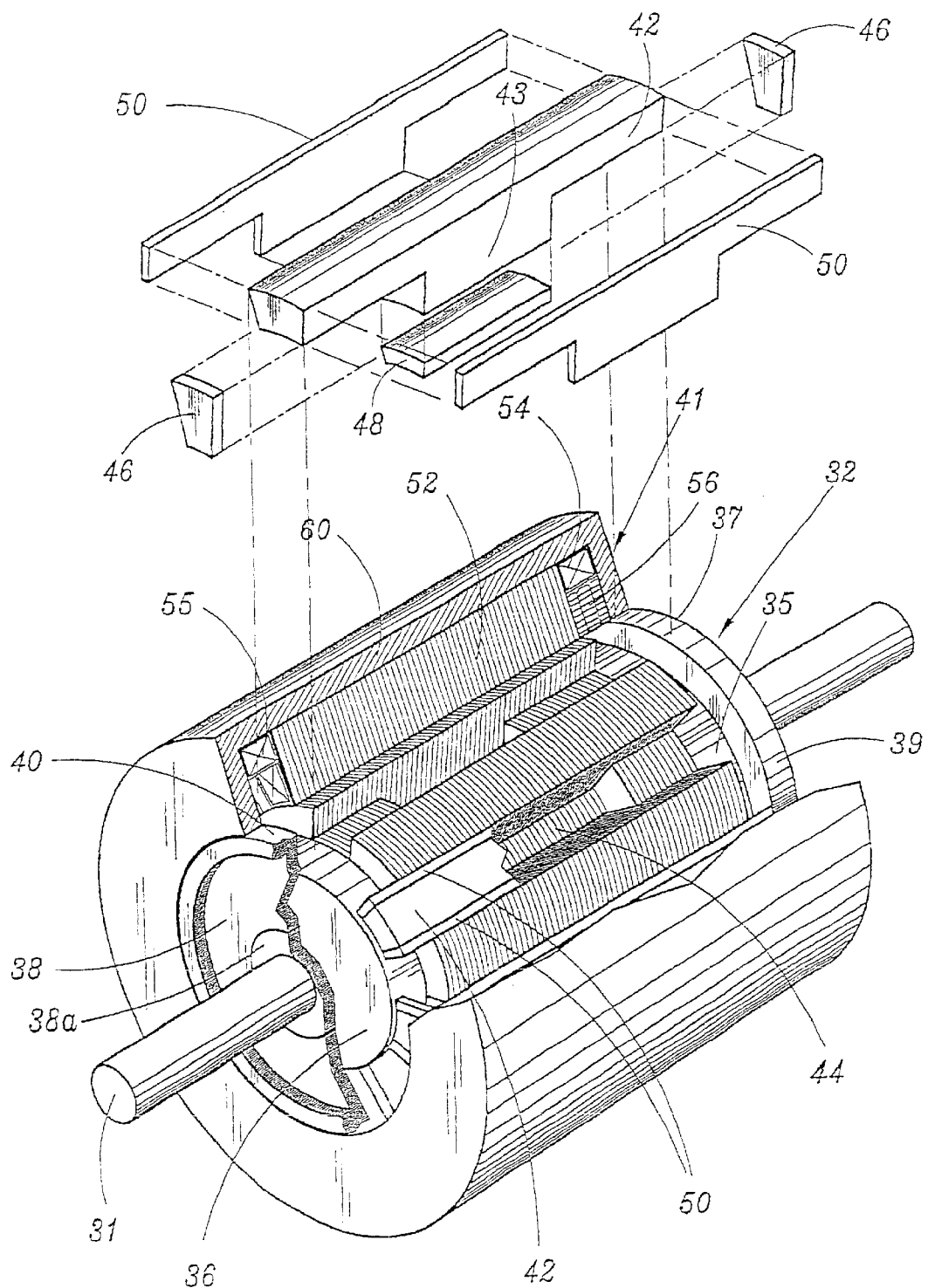
FIG. 3 is a partially exploded perspective view of another embodiment of the rotating machine according to the invention.

The rotating machine represented in FIGS. 1 and 2 comprises a shaft 1 on which is mounted a rotor 2 comprising a magnetic circuit formed of a laminated sheet core 3 provided at its periphery with uniformly distributed radial teeth 4.

Arranged axially on either side of the core 3 are annular excitation magnets 5, 6 with inverse polarities which are applied against the core by respective end flanges 7, 8 made of a magnetic material, mounted on the shaft 1.

Bushes 7a, 8a made of an a magnetic material for example of an insulating material, are interposed between the shaft 1 and the corresponding flanges 7, 8.

Each flange 7, 8 comprises a peripheral axial rim 9, 10 directed outward intended to cooperate with the magnetic circuit of a stator 11 associated with the rotor 2. In the spaces between the teeth 4 of the core 3 are housed axial bars 12 made of a magnetic material, for interlinking the end flanges 7, 8. The bars 12 are advantageously embodied in the form of tiles with a convex outer surface whose curvature corresponds to that of the outer surface of the rotor.

The stator 11 comprises an annular core made of laminated magnetic sheet 13 on either side of which are arranged excitation coils 14, 15 traversed by currents of opposite signs.

A stator coil 16 surrounded by the excitation coils 14, 15 is wound on the core 13 which for this purpose exhibits an inner surface formed of crenellations 18, as represented in FIG. 2.

The entire stator is housed in an outer magnetic ring 20 which is in contact with the outer surface of the magnetic core 13 and which comprises radial end rims 21, 22 arranged facing the respective axial rims 9, 10 of the flanges 7, 8 of the rotor so as to define gaps 23, 24 forming flux return paths.

According to one variant, the peripheral portions of the flanges 7, 8 may be devoid of axial rims. It is then sufficient for the flanges 7, 8 to be thick enough for their peripheral portions to define with the radial rims 21, 22 of the magnetic ring of the stator, flux return gaps of appropriate dimensions.

As may be seen clearly in FIG. 2, between each bar 12 for interlinking the end flanges 7, 8 and the neighboring teeth 4 of the core 3 are interposed radial magnets 25 which are flush with the outer surface of the rotor 2, defined by the ends of the teeth 4, and the outer surface of the linking bars 12.

In the present embodiment, the linking bars 12 are of constant cross section throughout their length.

The inner surface of each bar is separated from the bottom of the corresponding space between the teeth 4 of the core 3 by a clearance 26.

An additional magnet (not represented) may also be arranged in this clearance.

The presence in the rotor 2 of the linking bars 12 arranged between the flanges 7, 8 makes it possible to obtain between the stator and the rotor, an active central gap surface area having N pairs of magnetically non-short-circuited poles.

The axial rims of the flanges 7, 8 and the radial rims 21, 22 of the outer magnetic ring 20 define two flux return gap surfaces 23, 24 between the stator and the rotor.

The machine represented in FIGS. 3 to 5 differs essentially from the machine described with reference to FIGS. 1 and 2 by the form of the linking bars between the end flanges of the rotor.

Figure 4:
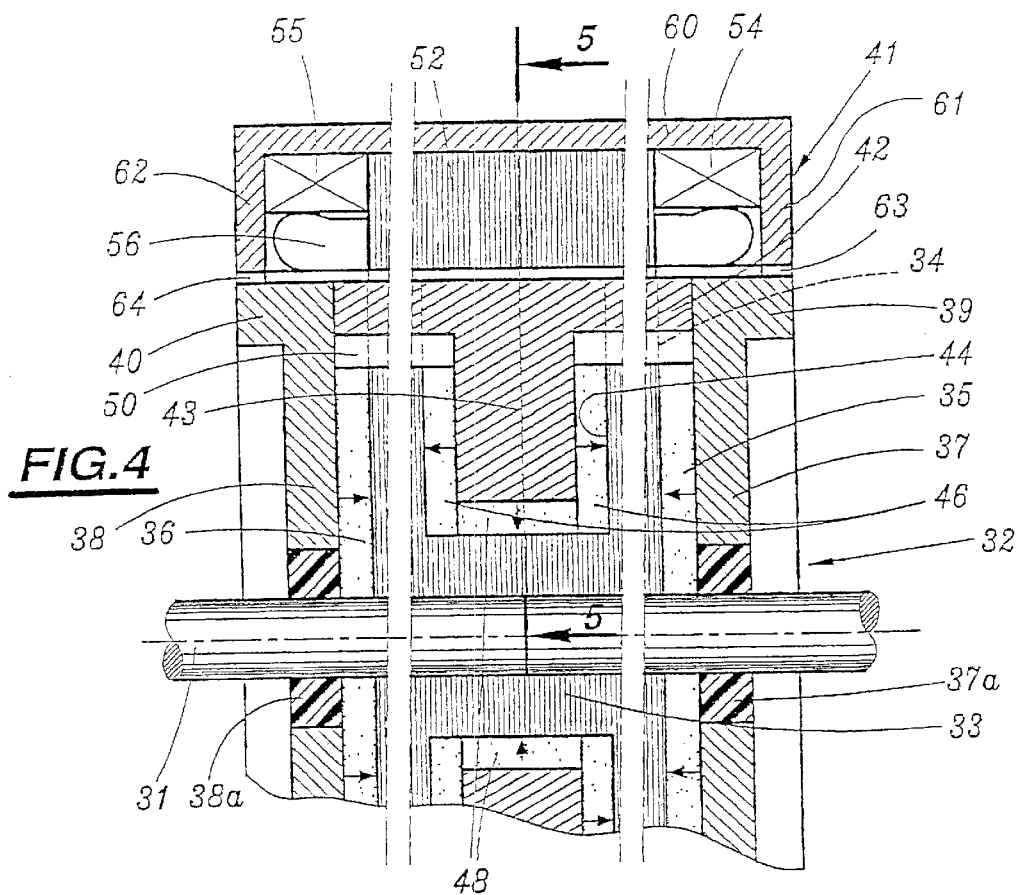
FIG. 4 is a view in elevation and in section of the machine of FIG. 3.
Figure 5:
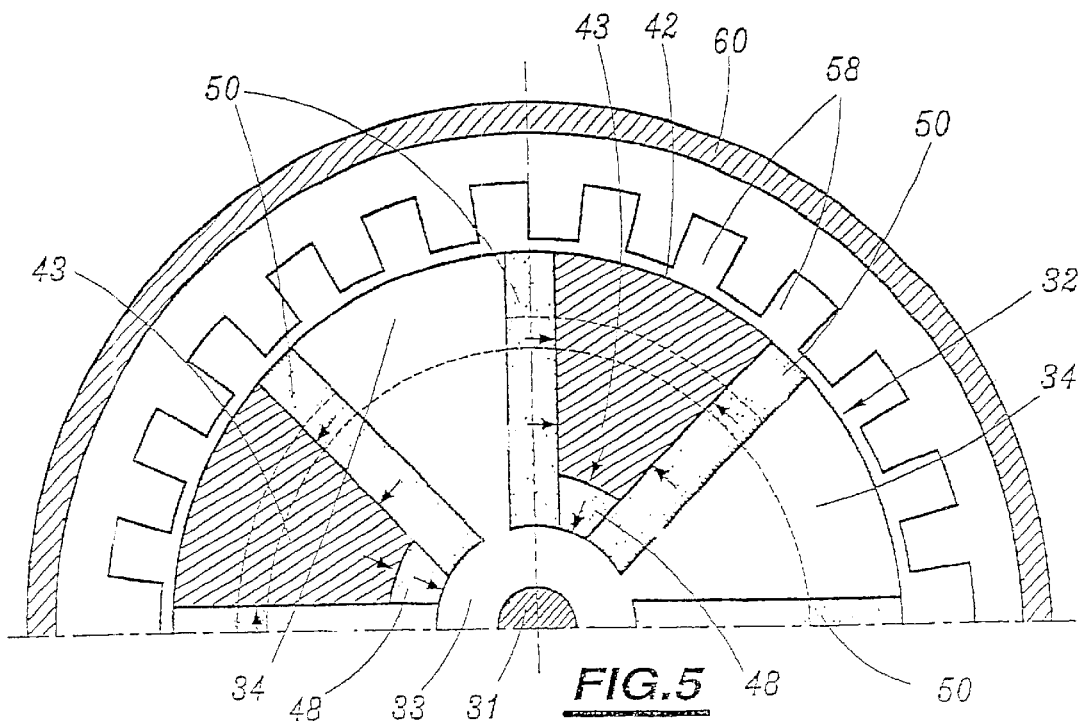
FIG. 5 is a section along the line 5—5 of FIG. 4.

As may be seen in FIGS. 3 to 5, the machine comprises, carried by a shaft 31, a rotor 32 comprising a magnetic circuit formed of a laminated sheet core 33 provided at its periphery with uniformly distributed teeth 34.

Arranged axially on either side of the core 33 are annular excitation magnets 35, 36 of inverse polarities which are applied against the core 33 by respective end flanges 37, 38 made of magnetic material, mounted on the shaft 31.

Bushes 37*a*, 38*a* made of an a magnetic material, for example an insulating material are interposed between the shaft 31 and the corresponding flanges 37, 38.

Each flange 37, 38 comprises an axial rim 39, 40 directed outward intended to cooperate with the magnetic circuit of a stator 41 associated with the rotor 32.

Bars 42 made of a magnetic material for interlinking the flanges 37, 38 are housed in the spaces between the teeth 34 of the core 33.

Each linking bar 42 has the form of a T. It extends between the end flanges 37, 38 and its central foot 43 is engaged in a housing 44 made in the bottom of each space between the teeth 34 of the core 33.

As represented in FIG. 4, between the foot 43 of the linking bar 42 and the walls of the housing 44 are interposed additional magnets 46 arranged on either side of the axial faces of the foot 43 and an additional magnet 48 arranged between that end of the foot 43 away from the bar proper and the bottom of the housing 44.

As may be seen better in FIG. 5 between the foot 43 of each bar 42 and the radial walls of the consecutive teeth 34 of the core 33 are arranged radial additional magnets 50 which may also be perceived in the perspective view of FIG. 3.

As in the embodiment of FIG. 1, the stator of the machine represented in FIGS. 3 to 5 comprises a laminated annular stator core 52 on either side of which are arranged excitation coils 54, 55.

A stator coil 56 is wound internally to the excitation coils 54, 56 on the core 52 which for this purpose exhibits an inner surface formed of crenellations 58 directed toward the outer surface of the rotor 32 (FIG. 5).

The entire stator is housed in an outer magnetic ring 60 in contact with the periphery of the stator magnetic core 52. The outer ring 60 comprises radial end rims 61, 62 arranged facing the respective peripheral portions or axial rims 39, 40 of the magnetic flanges 37, 38 of the rotor and defining with said rims, gaps 63, 64 forming flux return paths.

The layout just described differs from that described with reference to FIGS. 1 and 2 in that it offers more room for housing magnets around the teeth of the rotor, thereby consequently making it possible to increase the flux in the gap and the torque delivered by the machine.

It comprises a single toothed rotor core for an identical number of elementary cells.

It comprises no isthmus with the rotor, while the presence of the T-shaped magnetic bars simplifies the design of the machine.

What is claimed is:

1. A rotating electric machine with double excitation comprising a rotor and a stator whose magnetic circuit carries a stator coil (16; 56), in which machine the stator comprises an annular magnetic core (13; 52) and at least one excitation coil (14, 15; 54, 55), the stator coil (16; 56) being wound on the core, the assembly being arranged in a magnetic ring (20; 60) in contact with the outer surface of the stator core (13; 52), said ring comprising two radial end rims (21, 22; 61, 62), and the rotor (2; 32) comprises a magnetic circuit exhibiting peripheral portions (9, 10; 39, 40), said radial end rims (21, 22; 61, 62) of said magnetic ring (20; 60) of the stator defining, with the peripheral portions (9, 10; 39, 40) of the magnetic circuit of the rotor (2; 32), gaps (23, 24; 63,64) forming flux return paths, characterized in that the rotor comprises magnetic end flanges (7, 8; 37, 38) whose peripheral portions (9, 10; 39, 40) define with the radial end rims (21, 22; 61, 62) of said magnetic ring of the stator (11; 41) said flux return gaps, and the rotor comprises, arranged between the magnetic end flanges (7, 8; 37, 38), a magnetic core (3; 33) provided with radial teeth (4; 34) uniformly distributed at its periphery, annular magnets (5, 6; 35, 36) arranged on either side of the axial ends of the core (3; 33) and applied against the core by the magnetic end flanges, and several magnetic pieces for interlinking the end flanges, formed of bars (12; 42) having an at least axial part for linking the end flanges (7, 8; 37, 38) housed in the spaces between the radial teeth (4; 34) of the magnetic core (3; 33).

2. The machine as claimed in claim 1, characterized in that additional magnets (25; 50) are interposed between each of said bars (12; 42) and at least the side walls of the radial teeth (4; 34) of the core defining said spaces.

3. The rotating electric machine as claimed in claim 1, characterized in that the bars (12) for interlinking the end flanges (7, 8) have a constant cross section throughout their length.

4. The rotating electric machine as claimed in claim 2, characterized in that the bars (12) for interlinking the end flanges (7, 8) have a constant cross section throughout their length.

5. The rotating electric machine as claimed in claim 1, characterized in that the linking bars (42) comprise a central foot (43) engaged in a housing (44) made in the bottom of each space between two consecutive radial teeth (34) of the magnetic core (33), additional magnets (46, 48) being interposed between the central foot and the side and bottom walls of said housing (44).

6. The rotating electric machine as claimed in claim 2, characterized in that the linking bars (42) comprise a central foot (43) engaged in a housing (44) made in the bottom of each space between two consecutive radial teeth (34) of the magnetic core (33), additional magnets (46, 48) being interposed between the central foot and the side and bottom walls of said housing (44).

7. The rotating electric machine as claimed in claim 1, characterized in that it comprises a single toothed rotor core (3; 33).

8. The rotating electric machine as claimed in claim 2, characterized in that it comprises a single toothed rotor core (3; 33).

9. The rotating electric machine as claimed in claim 3, characterized in that it comprises a single toothed rotor core (3; 33).

10. The rotating electric machine as claimed in claim 4, characterized in that it comprises a single toothed rotor core (3; 33).

* * * * *